United States Patent
Bouzegzi et al.

(10) Patent No.: US 8,204,139 B2
(45) Date of Patent: Jun. 19, 2012

(54) BLIND ESTIMATION METHOD OF OFDM MODULATION PARAMETERS

(75) Inventors: Abdelaziz Bouzegzi, Grenoble (FR); Philippe Ciblat, Paris (FR); Pierre Jallon, Grenoble (FR)

(73) Assignee: Commissariat a l'Energie Atomique, Paris (FR)

(*) Notice: Subject to any disclaimer, the term of this patent is extended or adjusted under 35 U.S.C. 154(b) by 873 days.

(21) Appl. No.: 12/204,550

(22) Filed: Sep. 4, 2008

(65) Prior Publication Data

US 2009/0067521 A1    Mar. 12, 2009

(30) Foreign Application Priority Data

Sep. 6, 2007   (FR) ..................... 07 57385

(51) Int. Cl.
*H04L 27/28* (2006.01)
(52) U.S. Cl. ........................ 375/260; 375/259
(58) Field of Classification Search ............. 375/260, 375/259
See application file for complete search history.

(56) References Cited

U.S. PATENT DOCUMENTS 6,700,936 B1* 3/2004 Moss ............................ 375/260

FOREIGN PATENT DOCUMENTS

CA    2 298 316 A1    8/2000

OTHER PUBLICATIONS

French Search Report.
European Search Report.
Liu et al., "A Blind Time-parameters Estimation Scheme for OFDM in Multi-path Channel", National Key Lab of ISN. Xidian University.
Akmouche et al., "OFDM parameters estimation a time approach", Asilomar Conference on Signals, Systems and Computers. Oct. 29, 2000, pp. 142-142.
Yao et al., "Blind carrier frequency offset estimation for OFDMA-based wireless networks", IEEE Military Communications Conference, Oct. 31, 2004, pp. 1233-1239.
Yao et al., "Blind CFO estimation in OFDM systems" IEEE Workshop on Signal Processing Advances in Wireless Communications, Jul. 11, 2004, pp. 353-357.

* cited by examiner

*Primary Examiner* — Shuwang Liu
*Assistant Examiner* — Michael Neff
(74) *Attorney, Agent, or Firm* — Pearne & Gordon LLP

(57) ABSTRACT

The present invention concerns a blind estimation method of at least one temporal modulation parameter of an OFDM signal, in which a plurality of demodulation attempts of said OFDM signal are carried out using a plurality of respective values of this temporal parameter and, for each demodulation attempt, a cost function representative of the entropy of the demodulated signal is calculated, the estimate of said temporal parameter then being obtained as the value of this parameter minimizing said cost function.

28 Claims, 5 Drawing Sheets

BLIND ESTIMATION METHOD OF OFDM MODULATION PARAMETERS

TECHNICAL FIELD

The present invention concerns a blind estimation method of OFDM (Orthogonal Frequency Division Multiplex) modulation parameters and more particularly a blind estimation method based on a criterion of minimum entropy.

STATE OF THE PRIOR ART

OFDM modulation is well known in the prior art and is employed in numerous telecommunications systems such as DVB-T, ADSL, Wi-Fi (IEEE 802 a/g), WiMax (IEEE 802.16). It has the advantage of good spectral efficiency and good protection against frequency selective fading.

It will be recalled that in an OFDM system, the information symbols to be transmitted are grouped by blocks of N symbols, where N is generally a power of 2, the OFDM symbols being obtained by carrying out a IFFT (Inverse Fast Fourier Transform) on said blocks of information symbols. Generally, a cyclic prefix is added to the start of each OFDM symbol to absorb intersymbol interference or ISI and facilitate the equalisation at reception. The OFDM signal constituted by these OFDM symbols may if necessary then be frequency translated.

Generally speaking, the signal emitted by an OFDM system may be represented in baseband by:

$$s_a(t) = \frac{\sqrt{E}}{N} \sum_k g(t - k(N+D)T_c) \cdot \sum_{n=0}^{N-1} a_{k,n} e^{-2i\pi \frac{n}{NT_c}(t - DT_c - k(N+D)T_c)} \quad (1)$$

where E is the power of the signal, N is the number of carriers of the OFDM multiplex, $a_{k,n}$ are the information symbols relative to the block k, belonging to a M-ary modulation alphabet, typically BPSK, QPSK or QAM, $1/T_c$ is the flow rate of the information symbols where $T_c$ is the "bribe" or "chip" time, D is the size of the cyclic prefix expressed in number of bribes, g(t) is a shaping pulse of the OFDM symbols having a temporal support $[0,(N+D)T_c]$ intended to apodize the spectrum of the signal.

An OFDM signal is represented in a schematic manner in FIG. 1. It is constituted of a sequence of OFDM symbols, each symbol having a total time $(N+D)T_c$ including a useful time $NT_c$ and a time guard interval $T_{prefix}=DT_c$, in which is found the cyclic prefix. It will be recalled that, in a conventional manner, the cyclic prefix is a copy of the end of the OFDM symbol into the guard interval. In certain OFDM systems, the cyclic prefixes are simply omitted, in other words the useful parts of the symbols are separated by "empty" guard intervals. This transmission technique also enables the intersymbol interference to be eliminated but does not make the equalisation of the signal easy.

After propagation in the transmission channel, the OFDM signal received by the receiver may be expressed as:

$$r_a(t) = h \otimes s_a(t) + b(t) \quad (2)$$

where $h \otimes s_a$ is the convolution between the OFDM signal emitted, $s_a(t)$ is the impulsional response of the transmission channel h(t), and b(t) is a random function describing the noise. It will be assumed that the length of the impulsional response is less than the time of the guard interval, such that the intersymbol interference (ISI) may be disregarded.

FIG. 2 represents in a schematic manner the structure of an OFDM receiver.

After demodulation if necessary in baseband, the signal received is sampled in 210 at the chip frequency, then the samples are subjected to a series/parallel conversion in 220 to form blocks of N+D samples. The D first samples corresponding to the guard interval are discarded and the block of the N samples remaining corresponding to the useful part of the OFDM symbol is subjected to a FFT in 230. The demodulated symbols obtained are then subjected to a series conversion in 240.

Finally, assuming that the receiver is correctly time and frequency synchronised, the demodulated symbols may be expressed by:

$$\hat{a}_{k,n} = h_n a_{k,n} + b_{k,n} \quad (3)$$

where $h_n$ is a complex coefficient that depends on the impulse response of the transmission channel, and $b_{k,n}$ is a random variable representing a noise sample.

The correct operation of this receiver necessitates a precise temporal and frequency synchronisation. Indeed, it will be understood that an incorrect temporal synchronisation will lead to a progressive temporal drift of the truncation window and an incorrect frequency synchronisation, a phase rotation of the samples, may be represented by a multiplicative factor $e^{2i\pi\Delta f n T_c}$ where $\Delta f$ is the frequency offset between the demodulation frequency of the receiver and the carrier frequency of the OFDM multiplex.

The temporal and frequential synchronisation of the receiver is generally carried out by means of the acquisition of a training sequence.

The functioning of this detector obviously assumes that the temporal parameters of modulation of the OFDM signal are known. "Temporal parameters" is taken to mean the useful time $NT_c$, the time of the guard interval $DT_c$ and/or the repetition period $(N+D)T_c$ of these symbols.

Frequently, the receiver does not know a priori the temporal parameters of OFDM modulation and has to carry out their estimation blindly.

Several methods have been proposed to estimate blindly the temporal parameters. These methods exploit the presence of the cyclic prefix in the OFDM signal and the cyclostationarity properties that can be derived therefrom. The estimators proposed are based on the autocorrelation function of the OFDM signal. An example of such an estimation method may be found in the article of P. Liu et al. entitled "A blind time-parameters estimation scheme for OFDM in multi-path channel", published in Proc. 2005 Int'l Conference on Information, Communications and Signal Processing, vol. 1, pp. 242-247, 23-26 Sept. 2005.

These estimation methods have however the drawback of needing to acquire a high number of OFDM symbols to perform the calculation of the autocorrelation function. Moreover, these methods do not work in the case, set out above, where the OFDM signal does not contain cyclic prefixes.

The aim of the present invention is to propose a blind estimation method of modulation parameters of an OFDM signal that does not have the abovementioned drawbacks.

A subsidiary aim of the present invention is to enable a temporal and frequential synchronisation of the OFDM receiver that is rapid and does not require a training sequence.

DESCRIPTION OF THE INVENTION

The present invention is defined by a blind estimation method of at least one time parameter of modulation of an OFDM signal, in which a plurality of demodulation attempts of said OFDM signal are carried out by using a plurality of respective values of this time parameter and, for each demodulation attempt, a cost function representative of the entropy of the demodulated signal is calculated, the estimate of said time parameter then being obtained as the value of this parameter minimising said cost function.

Preferably, the OFDM signal is demodulated in baseband by means of a demodulation frequency, then sampled at a frequency greater than the Nyquist frequency to obtain a sequence of samples.

Advantageously, for each demodulation attempt, said samples are then corrected by a dephasing factor corresponding to a frequency offset value between the carrier frequency of the OFDM multiplex and the demodulation frequency.

For each demodulation attempt, the sequence formed by the samples thereby corrected may be amputated of a given number of its first samples, corresponding to a temporal offset.

For each demodulation attempt, the sequence thereby amputated may be cut up into blocks of given size. Then, each of the blocks thereby obtained is stripped of a given number of its first samples, corresponding to an OFDM symbol prefix time, and a FFT of each of the blocks thereby stripped is performed.

For each block k=0, . . . ,K−1 where K is the total number of blocks of the stripped sequence, the FFT may be calculated by:

$$\hat{a}_{k,n} = \sum_{p=0}^{\beta-1} \rho_p^k e^{2i\pi \frac{np}{\beta}}$$

where $\beta$ is the size of the amputated blocks, corresponding to an OFDM symbol useful time, $T_e$ is the sampling period, $\rho_p^k$ is the $(p+1)^{ieme}$ frequency corrected sample of the $k^{ieme}$ block and the $\hat{a}_{k,n}$, k=0, . . . ,K−1, n=0, . . . ,N̂−1, where N̂ is said useful time expressed in chip periods, form a sequence of demodulated symbols according to said demodulation attempt.

The value of said cost function may then be calculated from said sequence of demodulated symbols.

Advantageously, said cost function is the kurtosis. In this case, the value of said cost function may be calculated by:

$$\hat{\kappa}(\{\hat{a}_{k,n}\}) = \frac{\sum_{k=0}^{K-1}\sum_{n=0}^{\hat{N}-1}|\hat{a}_{k,n}|^4}{\left(\sum_{k=0}^{K-1}\sum_{n=0}^{\hat{N}-1}|\hat{a}_{k,n}|^2\right)^2} - 2 - \frac{\left|\sum_{k=0}^{K-1}\sum_{n=0}^{\hat{N}-1}(\hat{a}_{k,n})^2\right|^2}{\left(\sum_{k=0}^{K-1}\sum_{n=0}^{\hat{N}-1}|\hat{a}_{k,n}|^2\right)^2}$$

Advantageously, the estimation method takes place in an iterative manner, each iteration corresponding to a demodulation attempt by means of a said frequency offset value, a said temporal offset value, a said prefix time and a said useful time.

As the iterations proceed, a discrete series of frequency offset, temporal offset, prefix time and useful time values are preferably run through, according to a scanning algorithm, and the prefix time and/or the useful time achieving the minimum of the cost function on said series is retained as estimation of the temporal parameter(s).

Said scanning algorithm may be of gradient descent type.

According to an alternative embodiment, a plurality of first demodulation attempts are carried out to estimate a first time parameter, then a plurality of second demodulation attempts are carried out to estimate a second time parameter, said second demodulation attempts using the estimate of the first time parameter to demodulate the OFDM signal.

Advantageously, for each first demodulation attempt, the samples are corrected by a dephasing factor corresponding to a frequency offset value between the carrier frequency of the OFDM multiplex and the demodulation frequency.

For each first demodulation attempt, the sequence thereby stripped may be cut up after a given number of samples, said number corresponding to a given OFDM symbol useful time. A FFT is then carried out on the samples of the sequence thereby truncated.

The FFT may be calculated by:

$$\hat{a}_n = \sum_{p=0}^{\beta-1} \rho_p e^{2i\pi \frac{np}{\beta}}$$

where $\beta$ is the length of the truncated sequence, $T_e$ is the sampling period, $\rho_p$ is the $(p+1)^{ieme}$ frequency corrected sample of the truncated sequence, the $\hat{a}_n$, n=0, . . . ,N̂−1, where N̂ is said useful time expressed in chip periods, forming a sequence of demodulated symbols according to said first demodulation attempt.

A first value $(\Phi(\Delta\phi,\delta,\beta))$ of said cost function may be calculated from said sequence of demodulated symbols.

Advantageously, said cost function is the kurtosis.

In this case, the value of said cost function may be calculated by:

$$\hat{\kappa}(\{\hat{a}_n\}) = \frac{\sum_{n=0}^{\hat{N}-1}|\hat{a}_n|^4}{\left(\sum_{n=0}^{\hat{N}-1}|\hat{a}_n|^2\right)^2} - 2 - \frac{\left|\sum_{n=0}^{\hat{N}-1}(\hat{a}_n)^2\right|^2}{\left(\sum_{n=0}^{\hat{N}-1}|\hat{a}_n|^2\right)^2}$$

The estimation method operates advantageously in an iterative manner, each iteration corresponding to a first demodulation attempt by means of a said frequency offset value, a said temporal offset value, a said prefix time and a said useful time.

As the iterations proceed, a discrete series of frequency offset, temporal offset, prefix time and useful time values are preferably run through, according to a scanning algorithm, and the frequency offset, temporal offset and useful time values achieving the minimum of the cost function on said series is memorised, the estimation of the first time parameter being the useful time thereby memorised.

Each sample of said sequence of samples may be corrected by a dephasing factor corresponding to the frequency offset value thereby memorised.

Advantageously, for each second demodulation attempt, the sequence formed by the samples thereby corrected is stripped of a given number of its first samples, corresponding to a temporal offset, the stripped sequence is then cut up into blocks of given size and from each of said blocks a given number of its first samples is eliminated, corresponding to an OFDM symbol prefix time.

For each block k=0, . . . ,K−1 where K is the total number of blocks obtained, a FFT may be calculated by:

$$\hat{a}_{k,n} = \sum_{p=0}^{\beta_0-1} \rho_p^k e^{2i\pi \frac{np}{\beta_0}}$$

where $\beta_0$ is the memorised useful time value, expressed in number of samples, $T_e$ is the sampling period, $\rho_p^k$ is the $(p+1)^{ième}$ frequency corrected sample of the $k^{ième}$ block and the $\hat{a}_{k,n}$, k=0, . . . ,K−1, n=0, . . . ,N̂−1, form a sequence of demodulated symbols according to said second demodulation attempt.

A second value ($\Phi(\delta,\gamma)$) of said cost function is then calculated from said sequence of demodulated symbols.

Advantageously, said cost function is the kurtosis.

In this case, the value of said cost function is calculated by:

$$\Phi(\delta,\gamma) = \hat{\kappa}(\{\hat{a}_{k,n}\}) = \frac{\sum_{k=0}^{K-1}\sum_{n=0}^{\hat{N}-1}|\hat{a}_{k,n}|^4}{\left(\sum_{k=0}^{K-1}\sum_{n=0}^{\hat{N}-1}|\hat{a}_{k,n}|^2\right)^2} - 2 - \frac{\left|\sum_{k=0}^{K-1}\sum_{n=0}^{\hat{N}-1}(\hat{a}_{k,n})^2\right|^2}{\left(\sum_{k=0}^{K-1}\sum_{n=0}^{\hat{N}-1}|\hat{a}_{k,n}|^2\right)^2}$$

The estimation method takes place advantageously in an iterative manner, each iteration corresponding to a second demodulation attempt by means of memorised frequency offset and useful time values, of a said temporal offset value and a said prefix time.

As the iterations proceed, a discrete temporal offset and prefix time series is preferably run through, according to a scanning algorithm, and the temporal offset and prefix time values achieving the minimum of the cost function on said series is memorised, the estimation of the second time parameter being the prefix time thereby memorised.

Advantageously, the scanning algorithm is of gradient descent type.

BRIEF DESCRIPTION OF DRAWINGS

Other characteristics and advantages of the invention will become clear on reading a preferential embodiment of the invention and by referring to the appended figures in which.

DETAILED DESCRIPTION OF SPECIFIC EMBODIMENTS

Figure 1:
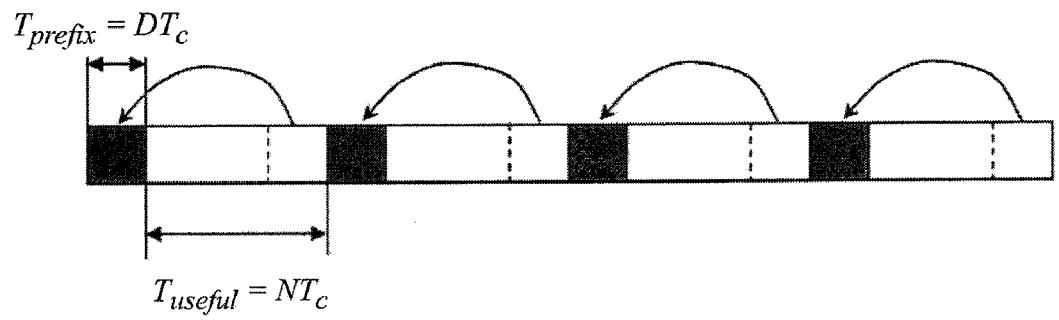
FIG. 1 illustrates in a schematic manner an OFDM signal.
Figure 2:
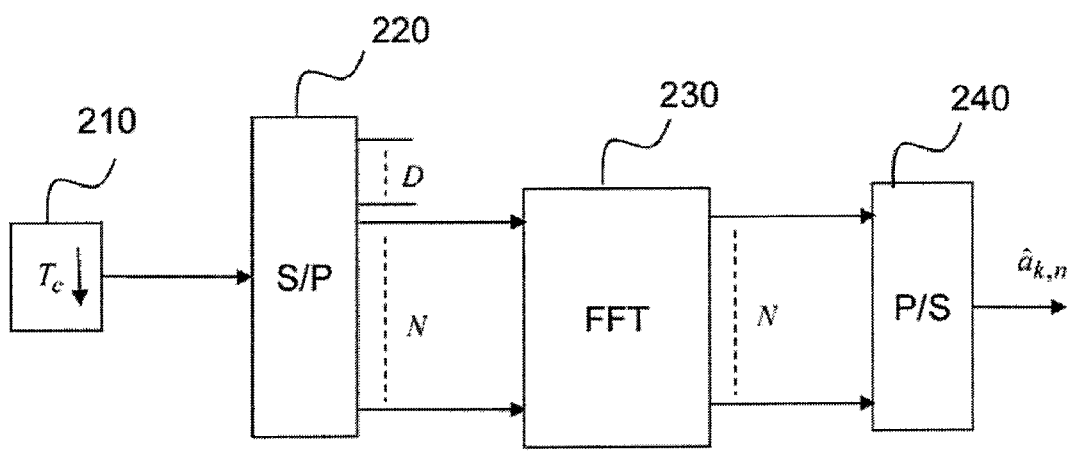
FIG. 2 illustrates in a schematic manner an OFDM receiver known to the prior art.

The case of a telecommunications system using an OFDM modulation will be considered hereafter. It will be assumed that the OFDM signal emitted has the form given by the expression (1) and that the information symbols may be represented by independent random variables, identically distributed and taking their values in a M-ary modulation alphabet. The OFDM symbols may contain or not a prefix. With a view to simplification, it will be considered that they contain a prefix but that this prefix may be empty.

It will be assumed that the transmission channel is of multipath type. The signal received by the receiver may then be expressed, in baseband, by:

$$r_a(t) = \sum_{l=1}^{L} \lambda_l s_a(t-\tau_l) = b(t) \quad (4)$$

where the $\lambda_l$ and $\tau_l$ are respectively the complex attenuation coefficients and the delays associated with the different paths, L is the total number of paths and b(t) an additive white Gaussian noise.

We will now place ourselves in a blind context, in other words the receiver does not know the modulation parameters of the OFDM signal, in particular the chip frequency of the signal.

The signal received is sampled at a frequency $$f_e = \frac{1}{T_e}$$

greater than the Nyquist frequency. One is therefore certain that the sampling period $T_e$ is less than the chip period $T_c$.

If it assumed firstly that the receiver is perfectly synchronised temporally and frequentially, the samples of signal received may be expressed in the following manner:

$$\forall p \in [0, \hat{P}-1[ \, [r_{k,p} = r_a(pT_e + \hat{D}T_c + k(\hat{N}T_c + \hat{D}T_c)) \quad (5)$$

$$= \sum_{l=1}^{L} \lambda_l s_a(pT_e + \hat{D}T_c +$$

$$k(\hat{N}T_c + \hat{D}T_c) - \tau_l)$$

in which, in a first instance, the noise term has been disregarded, where k,p are respectively the symbol number and the rank of the sample within a symbol, $\hat{D}T_c$ is an estimation of the time of the prefix and where $\hat{P}$ is a whole number such that $$\left|\hat{P}T_e - \hat{N}T_c\right| \text{ is minimal.}$$

The samples of signal received are subject to a discrete Fourier transform, to obtain the estimated demodulated symbols:

$$\hat{a}_{k,v} = \sum_{p=0}^{\hat{P}-1} r_{k,p} e^{2i\pi p \frac{vT_e}{\hat{N}T_c}} \quad (6)$$

Consider firstly the decoded symbols of the first OFDM symbol, i.e. $\{\hat{a}_{0,v}\}_v$. By using the expression (5):

$$\hat{a}_{0,v} = \sum_{l=1}^{L} \sum_{k \in \Omega_l} \frac{1}{N} \sum_{n=0}^{N-1} \tilde{a}_{k,n}^{(l)} \qquad (7)$$

$$\sum_{p=0}^{\hat{P}-1} e^{-2i\pi p T_e \left(\frac{n}{\hat{N}T_c} - \frac{v}{\hat{N}T_c}\right)} \lambda_l g(pT_e + \hat{D}T_c - \tau_l - k(N+D)T_c)$$

where $\hat{N}T_c$ is an estimation of the useful time of the OFDM symbols;

$$\tilde{a}_{k,n}^{(l)} = a_{k,n} e^{-2i\pi n(\hat{D}T_c - DT_c - \tau_l - k(N+D)T_c)/NT_c}$$

where $a_{k,n}$ is the $n^{th}$ sample of the block k transmitted;
$\Omega_l$ is the series of values $k \in \mathbb{Z}$ such that $\exists p \in [0, \hat{P}-1]$ such that $g(pT_e + \hat{D}T_c - \tau_l - k(N+D)T_c) \neq 0$. Without loss of generality, it will be assumed hereafter that $g=1_{(N+D)T_c}$, window function equal to 1 between 0 and $(N+D)T_c$ and zero everywhere else.

Consider the contribution of a path on the decoded symbol. To do this $\hat{a}_{0,v}^{(l)}$ is introduced such that:

$$\hat{a}_{0,v}^{(l)} = \sum_{k \in \Omega_l} \frac{1}{N}$$

$$\sum_{n=0}^{N-1} \tilde{a}_{k,n}^{(l)} \sum_{p=0}^{\hat{P}-1} e^{-2i\pi p T_e \left(\frac{n}{\hat{N}T_c} - \frac{v}{\hat{N}T_c}\right)} \lambda_l g(pT_e + \hat{D}T_c - \tau_l - k(N+D)T_c)$$

and thus:

$$\hat{a}_{0,v} = \sum_{l=1}^{L} \hat{a}_{0,v}^{(l)} \qquad (8)$$

If $\text{Card}(\Omega_l)=1$, it can be shown by making the hypothesis that N is large ahead of 1 (which is the case for the very large majority of OFDM systems) that:

$$\hat{a}_{0,v}^{(l)} = \frac{\lambda_l}{N} \sum_{n=0}^{N-1} \tilde{a}_{k(l),n}^{(l)} e^{i\theta} \frac{\sin\left(\pi \frac{\hat{N}T_c}{NT_c}\left(n - v\frac{NT_c}{\hat{N}T_c}\right)\right)}{\sin\left(\pi T_e\left(n - v\frac{NT_c}{\hat{N}T_c}\right)\right)} \qquad (9)$$

and that $$\hat{a}_{0,v}^{(l)} = \frac{\lambda_l}{NT_e} \tilde{a}_{k(l),v}^{(l)} e^{i\theta}$$

if and only if $\hat{N}T_c = NT_c$.

On the other hand, if $\text{Card}(\Omega_l)>1$, the decoded symbol $\hat{a}_{0,v}^{(l)}$ always depends on at least two independent OFDM symbols.

By applying this result to the estimated symbol $$\hat{a}_{0,v} = \sum_{l=1}^{L} \hat{a}_{0,v}^{(l)},$$

it may be deduced by expressing $\tilde{a}_{k(l),v}^{(l)}$ as a function of $a_{k(l),v}$ that:

$$\hat{a}_{0,v} = a_{k,n} \sum_{l=1}^{L} \frac{\lambda_l}{NT_e} e^{-2i\pi n(\hat{D}T_c - DT_c - \tau_l - k(N+D)T_c)/NT_c} e^{i\theta} \qquad (10)$$

if and only if, $\forall l, k(l)=k$.

It may be deduced from this first result that if the samples $r_{0,p}$ are samples of a same OFDM symbol, (the same for all the paths), then the estimated symbols $\hat{a}_{0,v}$ only depend on a single one of the transmitted symbols, $\tilde{a}_{0,v}$ if and only if $\hat{N}T_c = NT_c$. If not, in all other cases, $\hat{a}_{0,v}$ depends on at least two of the symbols transmitted It will be noted that if the time of the cyclic prefix is longer than the length of the impulse response of the transmission channel, there is no intersymbol interference. More precisely, the useful part of an OFDM symbol being propagated along a path is not interfered by another OFDM symbol being propagated along another path.

Figure 3A:
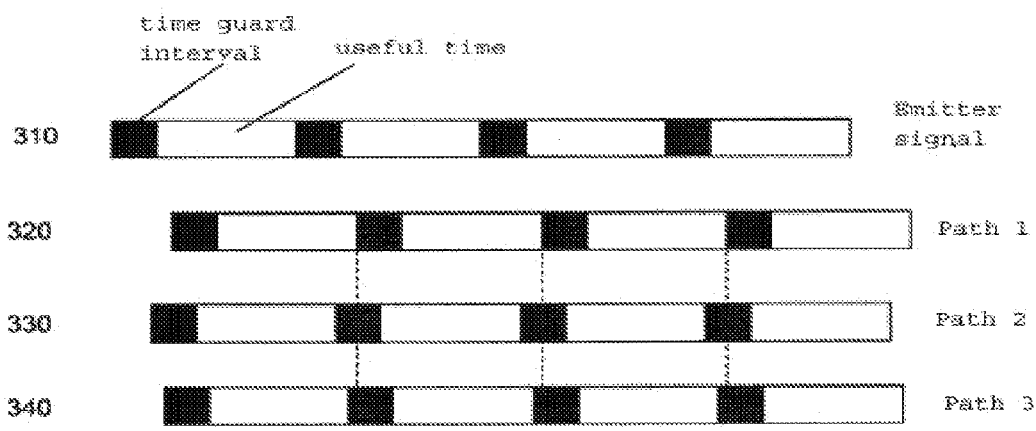
FIGS. 3A and 3B represent the respective contributions of the different paths to the OFDM signal received by a receiver.

In FIG. 3A is represented the OFDM signal 310 as emitted by the emitter and in 320, 330, 340, the contributions to the signal received, corresponding to the propagation of said OFDM signal along three separate paths. It will be noted that the useful part of an OFDM symbol propagating on one path does not overlap another OFDM symbol propagating on another path.

This result also holds for the other OFDM symbols, in other words for k>0. One deduces from this, that an estimated symbol $\hat{a}_{k,v}$, for any k, only depends on a single one of the symbols transmitted if and only if $\hat{D}T_c = DT_c$. If this is not the case, it can be shown that the samples $r_{k,p}$ correspond to samples of at least 2 OFDM symbols.

Figure 3B:
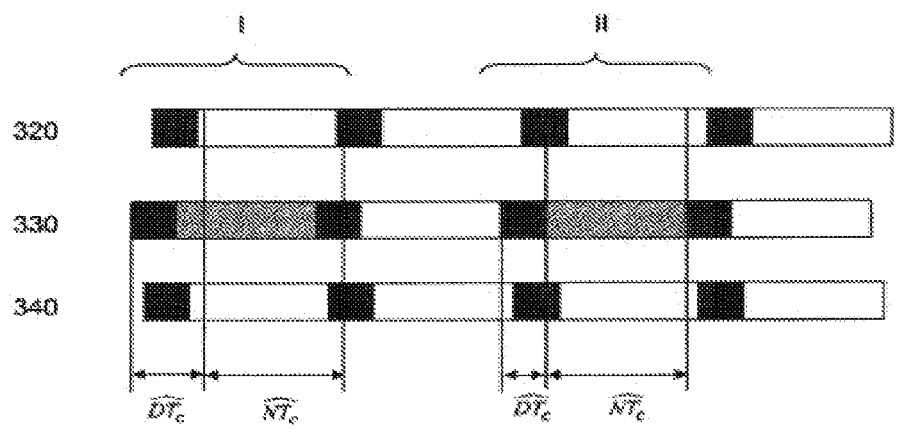

This result is illustrated in FIG. 3B, the OFDM signals being propagated along the three paths. In I is represented the case of an exact estimate $\hat{N}T_c$ but with an erroneous estimate $\hat{D}T_c$. It will be understood that two consecutive OFDM symbols then intervene in the calculation of $\hat{a}_{k,v}$ (the estimated useful part of width $\hat{N}T_c$ then covers the prefix of the following symbol). In other words, $\text{Card}(\Omega)=2$. In the same way, in II is represented the case where the estimates $\hat{N}T_c$ and $\hat{D}T_c$ are exact. It will be seen that an OFDM symbol then intervenes in the calculation of $\hat{a}_{\mu,v}$.

An incorrect estimation of time parameter leads to $\text{Card}(\Omega) \geq 2$ which increases the entropy of the demodulated signal compared to the case where one has an exact estimation $(\text{Card}(\Omega)=1)$.

The basic idea of the invention is to use a criterion of minimum entropy to determine whether the sampling boundaries are aligned on the start and the end of the useful part of an OFDM signal.

To do this, the signal sampled is demodulated by varying the modulation parameters and the parameter(s) leading to a minimum of entropy of the signal thereby demodulated is(are) selected.

Indeed, if the sampling boundaries are well aligned on the start and the end of the useful part, the entropy of the demodulated sequence will be minimal. On the other hand, from the moment that these boundaries are offset in relation to the limits of the useful part, the portion of OFDM symbol preceding or following the current symbol will lead to an increase in the entropy of the demodulated sequence.

In order to minimise the entropy, a cost function, representative of the entropy of the demodulated signal, for example the kurtosis of this sequence, is used.

It will be recalled that the kurtosis of a random variable is the ratio between its fourth order cumulant and the square of its variance. More precisely, if $\alpha$ is a complex random variable, the kurtosis of $\alpha$ may be written as:

$$\kappa(\alpha) = \frac{cum_4(\alpha)}{(cum_2(\alpha))^2} = \frac{E\{|\alpha|^4\}}{(E\{|\alpha|^2\})^2} - 2 - \frac{|E\{\alpha^2\}|^2}{(E\{|\alpha|^2\})^2} \quad (11)$$

where one has noted $E\{x\}$ the mathematical expectation of x. If $\alpha_n$, $n=0, \ldots, N-1$ is a realisation of a sequence of N independent and identically distributed (i.i.d.) random variables, the kurtosis of the sequence $\alpha$ is estimated by:

$$\hat{\kappa}(\alpha) = \frac{\sum_{n=0}^{N-1}|\alpha_n|^4}{\left(\sum_{n=0}^{N-1}|\alpha_n|^2\right)^2} - 2 - \frac{\left|\sum_{n=0}^{N-1}\alpha_n^2\right|^2}{\left(\sum_{n=0}^{N-1}|\alpha_n|^2\right)^2} \quad (12)$$

It should be noted that the kurtosis of a random variable is also a measurement of the difference between its probability density and a Gaussian distribution. In particular, the kurtosis of a Gaussian random variable is zero.

Furthermore, it can be shown that the kurtosis has the following important property, namely if:

$$x_k = \sum_{n=0}^{N-1} \lambda_{k,n} a_n \quad (13)$$

where $a_n$, $n=0, \ldots, N-1$ is a sequence of i.i.d. random variables, and the $\lambda_{k,n}$, $n=0, \ldots, N-1$ are N complex coefficients, one has:

$$\kappa(x_k) \geq \min_n \kappa(a_n) \quad (14)$$

equality being only obtained if $\exists n_0 \in \{0, \ldots N-1\}$ such that:

$$\lambda_{k,n_0} \neq 0 \text{ et } \forall n \neq n_0 \lambda_{k,n} = 0 \quad (15)$$

where $$n_0 = \underset{n}{\arg\min} \kappa(a_n).$$

If this property is applied to the estimated symbols $\hat{a}_{k,v}$, it may be derived that the kurtosis is minimal if and only if, $\forall(k,v), \hat{a}_{k,v}$ only depends on a single symbol emitted. Consequently, $\kappa(\hat{a}_{\mu,v})$ will be minimal and equal to $\kappa(a_{k,n})$ if and only if $\hat{N}T_c = NT_c$ and $\hat{D}T_c = DT_c$.

This may be understood intuitively in so far as an incorrect estimation of temporal parameters leads to $\hat{a}_{\mu,v}$ estimates involving a greater number of i.i.d. random variables corresponding to the information symbols $a_{k,n}$. In application of the central limit theorem, the kurtosis of $\hat{a}_{\mu,v}$ then approaches that of a Gaussian random variable, i.e. tends towards zero by increasing values.

The presence of the Gaussian noise in (4) does not change in any way the previous result. Indeed, if $y(t)=s(t)+b(t)$ where $b(t)$ is an additive Gaussian noise:

$$\kappa(y) = \frac{cum_4(s) + cum_4(b)}{(E(|s|^2) + \sigma_b^2)^2} \quad (16)$$
$$= \frac{cum_4(s)}{(E(|s|^2) + \sigma_b^2)^2}$$
$$= \kappa(s)\frac{E(|s|^2)}{(E(|s|^2) + \sigma_b^2)^2}$$

where one has noted $cum_4(.)$ the fourth order cumulant and $\sigma_b^2$ the noise variance. Given that b is Gaussian, one has $cum_4(b)=0$. It ensues from (16) that the kurtosis of y is proportional to the kurtosis of s. Consequently, the minimisation of the kurtosis of y leads to minimisation of the kurtosis of s and therefore to the correct estimation of the temporal parameters $DT_c$ and $NT_c$.

The previous result assumes that the receiver is temporally and frequentially synchronised with the OFDM signal. If this is not the case, the previous result remains nevertheless valid, the synchronisation defect leading to an increase of the kurtosis of the sequence sampled.

The search for the temporal and/or frequential synchronisation may be carried out jointly or prior to the estimation of the modulation parameters of the OFDM signal.

Figure 4:
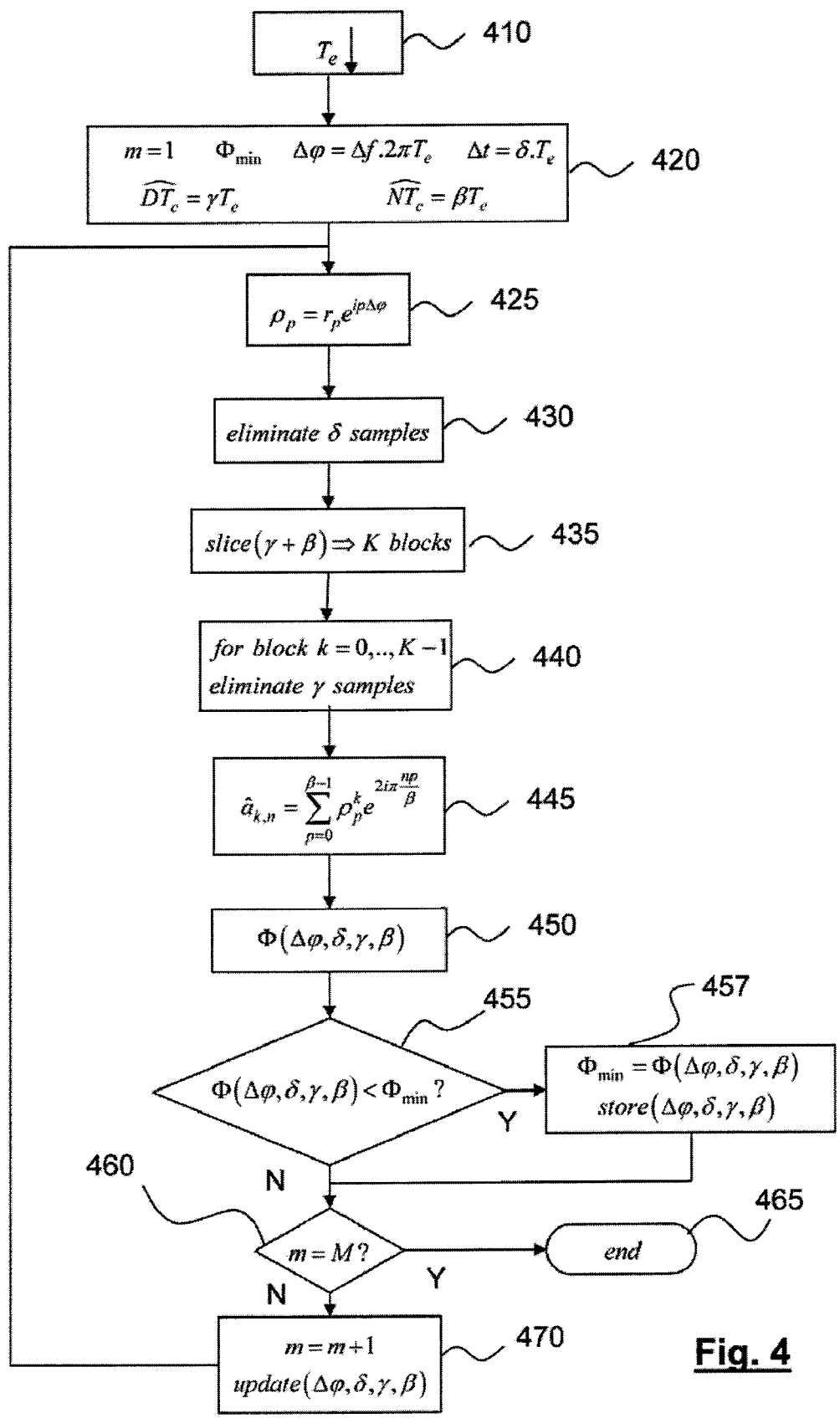
FIG. 4 gives a block diagram of the estimation method of OFDM modulation parameters according to a first embodiment of the invention.

FIG. 4 represents a block diagram of an estimation method of the modulation parameters of the OFDM signal, according to a first embodiment of the invention.

In this embodiment, the search for the temporal and/or frequential synchronisation is carried out in the same optimisation loop as the estimation of the OFDM modulation parameters.

At step 410, after demodulation if necessary in base band of the signal received, a sampling is carried out at a frequency greater than the Nyquist frequency, in other words with a sampling period $T_e$ less than the chip period $T_c$ of the OFDM signal emitted.

At step 420, one initialises the number of iterations m at 1 and a value $\Phi_{min}$ at a high number. One then initialises the value of the frequency offset $\Delta f$ (or in an equivalent manner a phase value $\Delta\phi=\Delta f.2\pi T_e$) corresponding to the difference between the carrier frequency of the OFDM multiplex and the demodulation frequency, the temporal offset $\delta$, expressed in number of samples, i.e. $\Delta t=\delta.T_e$ where $\Delta t$ determines the start of the sampling window of the OFDM signal. One finally initialises the values of the temporal parameters of modulation, expressed in number of samples, i.e. $\gamma$ and $\beta$, such that $\hat{D}T_c = \gamma T_e$ and $\hat{N}T_c = \beta T_e$. These values expressed in number of chip periods are noted $\hat{N}$ and $\hat{D}$. It will be noted that $\hat{N}$ is also the number of assumed carriers for the OFDM multiplex. One could in particular initialise $\hat{N}$ at a low number of carriers of an OFDM system, for example $\hat{N}$=64.

One then enters into an iterative loop aiming to search for the minimum entropy of the demodulated sequence. Advantageously, a function representative of the entropy of the demodulated sequence is used, preferably the kurtosis of this sequence. Each iteration of the loop corresponds to a demodulation attempt of the OFDM signal by means of a quadruplet of different parameters, as explained hereafter.

At step 425, the samples received from the dephasing corresponding to said frequency offset are corrected $\Delta f$, i.e. $\rho_p = r_p e^{ip\Delta\phi}$.

At step 430, the $\delta$ first samples of the sequence thereby obtained are eliminated. The sampling window is thereby locked.

At step 435, the sequence sampled is cut up into blocks of size $\gamma+\beta$. I.e. K the number of full blocks thereby obtained. One notes $\rho_p^k$, p=0, ..., $\beta$−1 the samples of the $k^{th}$ block.

At step 440, one eliminates from each of these K blocks obtained the $\gamma$ first samples, in other words those corresponding to the assumed prefix.

At step 445, a FFT of size $\beta$ of the K blocks thereby obtained is then carried out, i.e.:

$$\hat{a}_{k,n} = \sum_{p=0}^{\beta-1} \rho_p^k e^{2i\pi \frac{np}{\beta}} \quad \forall k \in [0, K-1]; \quad \forall n \in [0, \hat{N}-1] \tag{17}$$

In 450, the value of the cost function, noted $\Phi$ is calculated from demodulated symbols. Obviously, this value depends on the choice of the temporal and frequential offset values, as well as the modulation parameters, i.e. $\Phi(\Delta\phi,\delta,\gamma,\beta)$. If the cost function used is the kurtosis $\kappa$:

$$\Phi(\Delta\varphi, \delta, \gamma, \beta) = \hat{\kappa}(\{\hat{a}_{k,n}\}) \tag{18}$$

$$= \frac{\sum_{k=0}^{K-1}\sum_{n=0}^{\hat{N}-1} |\hat{a}_{k,n}|^4}{\left(\sum_{k=0}^{K-1}\sum_{n=0}^{\hat{N}-1} |\hat{a}_{k,n}|^2\right)^2} - 2 - \frac{\left|\sum_{k=0}^{K-1}\sum_{n=0}^{\hat{N}-1} (\hat{a}_{k,n})^2\right|^2}{\left(\sum_{k=0}^{K-1}\sum_{n=0}^{\hat{N}-1} |\hat{a}_{k,n}|^2\right)^2}$$

In 455, one compares the value $\Phi(\Delta\phi,\delta,\gamma,\beta)$ to $\Phi_{min}$.

If $\Phi(\Delta\phi,\delta,\gamma,\beta)<\Phi_{min}$, the minimal value $\Phi_{min}$ is updated in 457 by means of $\Phi_{min}=\Phi(\Delta\phi,\delta,\gamma,\beta)$ and the corresponding current values are stored $\Delta\phi,\delta,\gamma,\beta$.

In all cases, one goes through step 460. One compares m with a predetermined maximal number of iterations M. If this maximal number is attained, the algorithm is terminated in 465. If not, one moves onto step 470.

In 470, the counter m of iterations is incremented, the values of $\Delta\phi,\delta,\gamma,\beta$ are updated according to a scanning plan. For example, each of the variables $\Delta\phi,\delta,\gamma,\beta$ will be authorised to take a series of discrete values within a predetermined respective interval $I_{\Delta\phi}, I_\delta, I_\gamma, I_\beta$, the scanning then being carried out within a four dimensional space within the volume $I_{\Delta\phi} \times I_\delta \times I_\gamma \times I_\beta$. The scanning may be systematic and predefined. One could however use advantageously an algorithm of the gradient descent type to update at each iteration the values of $\Delta\phi,\delta,\gamma,\beta$. After the updating of the variables one returns to step 425 for a new demodulation attempt.

At the end of the scanning, in other words in 465, when the number M of iterations is attained, the parameters $\Delta\phi_0,\delta_0,\gamma_0,\beta_0$ making the value $\Phi_{min}$ are then used to demodulate the OFDM signal, namely:

$$\Delta f = \frac{\Delta\varphi_0}{2\pi T_e}; \Delta t = \delta_0 \cdot T_e; T_c = \gamma_0 T_e; T_c = \beta_0 T_e; \tag{19}$$

It will be noted that this algorithm makes it possible to obtain a synchronisation at the end of a low number of OFDM symbols as well as an acquisition just as rapid of the temporal parameters of modulation OFDM.

Once the demodulation has been obtained by means of the parameters (19), the equalisation of the demodulated symbols may be carried out, in a manner known to those skilled in the art to estimate the information symbols.

In order to further reduce the acquisition time, it is possible to proceed in two stages, by performing a first rough estimation of the synchronisation parameters and a modulation parameter, then by performing a finer estimation of the temporal offset and the other modulation parameter.

Figure 5A:
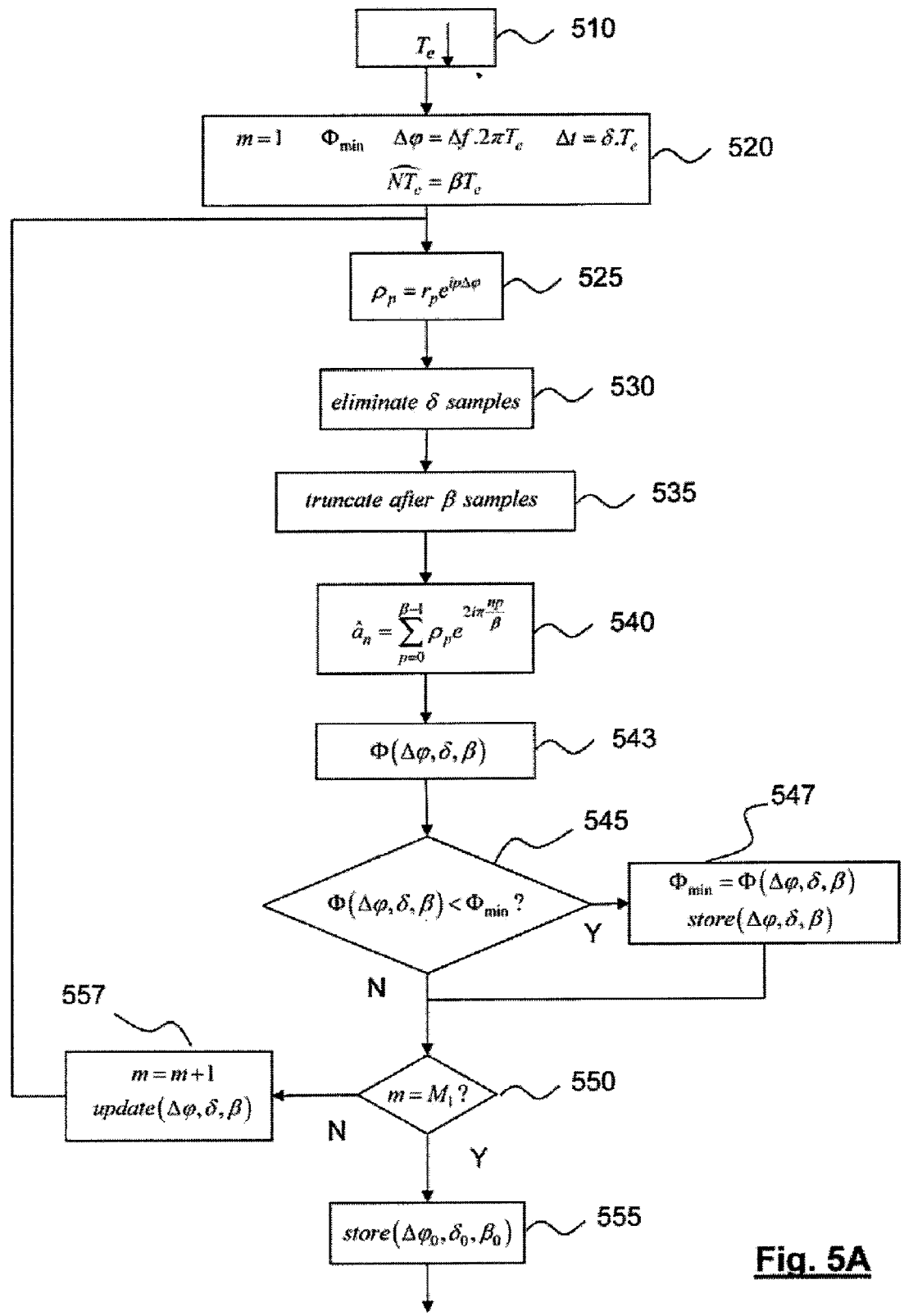
FIGS. 5A and 5B give a block diagram of the estimation method of OFDM modulation parameters according to a second embodiment of the invention.
Figure 5B:
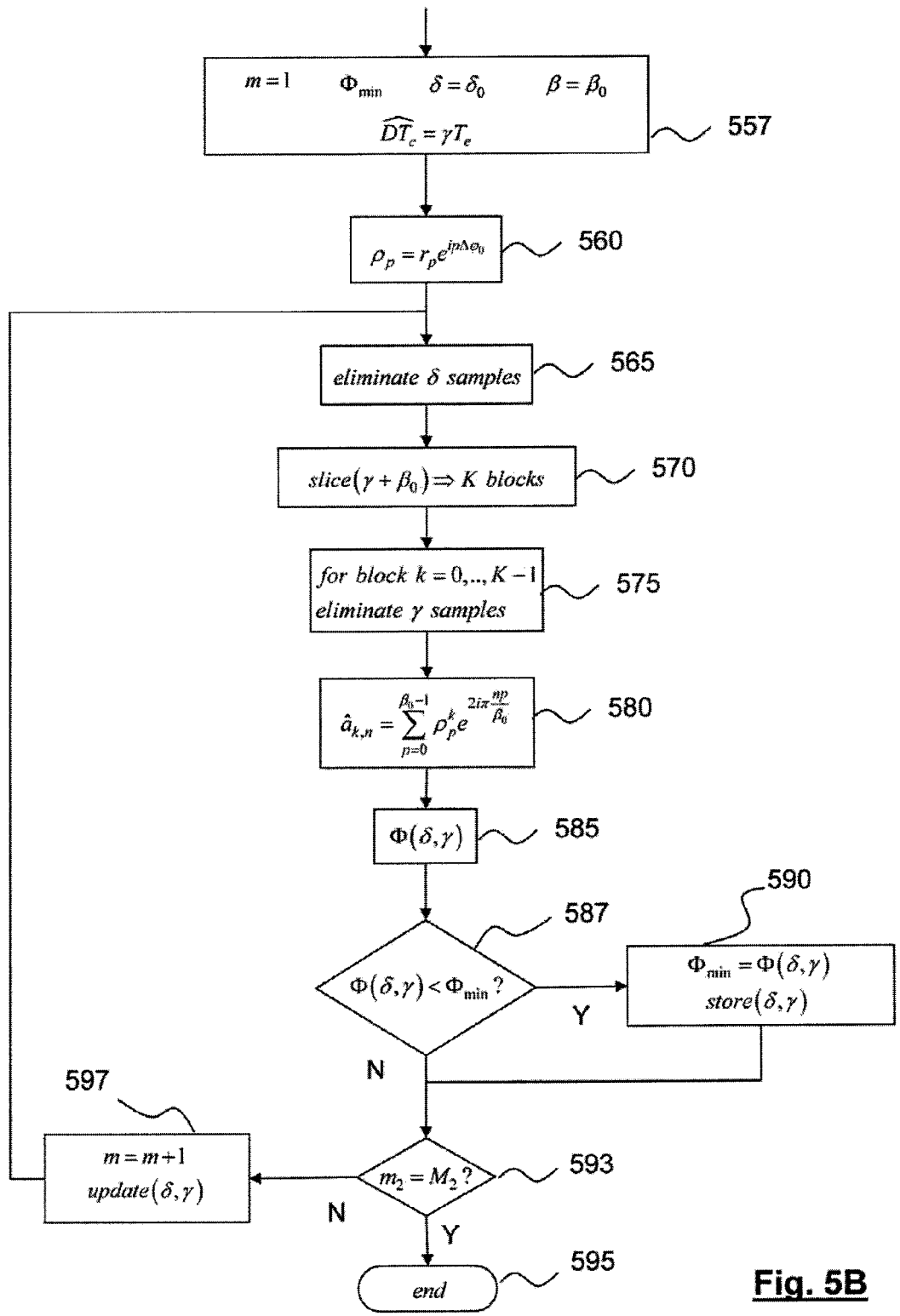

FIG. 5A and FIG. 5B represent a block diagram of an estimation method of the temporal parameters of modulation of an OFDM signal, according to a second embodiment of the invention.

In this embodiment, in a first loop a rough synchronisation search on a single OFDM symbol is carried out.

Step 510 is identical to step 410, the signal received is sampled at a frequency greater than that of Nyquist, after demodulation if necessary in baseband.

At step 520, one initialises the number of iterations $m_1$ at 1 and a value $\Phi_{min}$ at a high number. The value of the frequency offset $\Delta f$ (or in an equivalent manner a phase value $\Delta\phi=\Delta f.2\pi T_e$), the temporal offset value $\delta$, expressed in number of samples as well as the prefix time, expressed in number of samples, $\beta$, are then initialised.

At step 525, the received samples are corrected from the phase offsets corresponding to the frequency offset $\Delta f$, i.e. $\rho_p = r_p e^{ip\Delta\phi}$.

At step 530, the $\delta$ first samples of the sequence thereby obtained are removed.

At step 535, the sequence obtained after $\beta$ samples is truncated and, in 540 a FFT of size $\beta$ on these samples is then carried out, i.e.:

$$\hat{a}_n = \sum_{p=0}^{\beta-1} \rho_p e^{2i\pi \frac{np}{\beta}} \quad \forall n \in [0, \hat{N}-1] \tag{20}$$

where the samples of the previously truncated sequence have been noted $\rho_p$, p=0, ..., $\beta$−1.

At step 540, the value of the entropic cost function $\Phi$ is calculated from the demodulated symbols. This value depends on the temporal and frequential offset values, as well as the parameter $\beta$, i.e. $\Phi(\Delta\phi,\delta,\beta)$. If the cost function used is the kurtosis $\kappa$, one simply has:

$$\Phi(\Delta\varphi, \delta, \beta) = \hat{\kappa}(\{\hat{a}_n\}) = \frac{\sum_{n=0}^{\hat{N}-1} |\hat{a}_n|^4}{\left(\sum_{n=0}^{\hat{N}-1} |\hat{a}_n|^2\right)^2} - 2 - \frac{\left|\sum_{n=0}^{\hat{N}-1} (\hat{a}_n)^2\right|^2}{\left(\sum_{n=0}^{\hat{N}-1} |\hat{a}_n|^2\right)^2} \tag{21}$$

At step 545, one compares the value $\Phi(\Delta\phi,\delta,\beta)$ to $\Phi_{min}$.

If $\Phi(\Delta\phi,\delta,\beta)<\Phi_{min}$, the minimal value $\Phi_{min}$ is updated in 547 by means of $\Phi_{min}=\Phi(\Delta\phi,\delta,\beta)$ and the corresponding current values are stored $\Delta\phi,\delta,\beta$.

In all cases, one goes through step 550. One compares $m_1$ with a maximal predetermined number of iterations $M_1$. If this maximal number is attained, one moves onto step 555. If not, in 557, the values of $\Delta\phi,\delta,\beta$ are updated according to a scanning algorithm. This algorithm may be systematic by scanning according to a pre-established order of discrete values in a volume $I_{\Delta\phi} \times I_\delta \times I_\beta$, or even be adaptive, for example of the gradient descent type. After updating the values $\Delta\phi,\delta,\beta$, one returns to step 525.

At step 555, one memorises the values $\Delta\phi_0,\delta_0,\beta_0$ making $\Phi_{min}$. They correspond to an estimation of the frequential and temporal offsets as well as the useful length of the OFDM symbols:

$$\Delta f = \frac{\Delta\varphi_0}{2\pi T_e}; \quad \Delta t = \delta_0 \cdot T_e; \quad T_c = \beta_0 T_e \qquad (22)$$

One then uses these values to initialise the second iteration loop. More precisely:

One initialises, in 557, the counter of iterations, $m_2$, at 1, $\delta$ at the value $\delta_0$, as well as the time of the prefix, expressed in number of samples, $\gamma$.

At step 560, the samples received from the dephasing corresponding to the frequency offset $\Delta f$ are corrected, i.e. $\rho_p = r_p e^{ip\Delta\phi_0}$.

One enters into the second iteration loop at step 565. In 565, $\delta$ first samples of the sequence thereby obtained are eliminated.

At step 570, the sequence sampled is cut up into blocks of size $\gamma+\beta_0$. K denotes the number of full blocks thereby obtained. $\rho_p^k$, $p=0,\ldots,\beta_0-1$ denote the samples of the $k^{th}$ block.

In 575, one eliminates from each of these K blocks obtained the $\gamma$ first samples, in other words those assumed to belong to the prefix.

At step 580, a FFT of size $\beta_0$ of the K blocks thereby obtained is performed, i.e.:

$$\hat{a}_{k,n} = \sum_{p=0}^{\beta_0-1} \rho_p^k e^{2i\pi \frac{np}{\beta_0}} \quad \forall k \in [0, K-1]; \quad \forall n \in [0, \hat{N}-1] \qquad (23)$$

In 585, the value of the cost function is calculated from the demodulated symbols. This value depends on the choice of the temporal offset value as well as the parameter $\gamma$, i.e. $\Phi(\delta,\gamma)$ since $\Delta f$ and $NT_c$ are respectively fixed at $$\frac{\Delta\varphi_0}{2\pi T_e} \text{ and } \beta_0 T_e.$$

If the cost function used is the kurtosis $\kappa$:

$$\Phi(\delta,\gamma) = \hat{\kappa}(\{\hat{a}_{k,n}\}) = \frac{\sum_{k=0}^{K-1}\sum_{n=0}^{\hat{N}-1}|\hat{a}_{k,n}|^4}{\left(\sum_{k=0}^{K-1}\sum_{n=0}^{\hat{N}-1}|\hat{a}_{k,n}|^2\right)^2} - 2 - \frac{\left|\sum_{k=0}^{K-1}\sum_{n=0}^{\hat{N}-1}(\hat{a}_{k,n})^2\right|^2}{\left(\sum_{k=0}^{K-1}\sum_{n=0}^{\hat{N}-1}|\hat{a}_{k,n}|^2\right)^2} \qquad (24)$$

At step 587, one compares the value $\Phi(\delta,\gamma)$ to $\Phi_{min}$.

If $\Phi(\delta,\gamma) < \Phi_{min}$, the minimal value $\Phi_{min}$ is updated in 590 by $\Phi_{min} = \Phi(\delta,\gamma)$ and the corresponding values $\delta,\gamma$ are stored.

At step 593, one compares $m_2$ with a maximal predetermined number of iterations $M_2$. If this maximal number is attained, 595 is terminated. If not, one moves onto step 597.

In 597, the counter $m_2$ of iterations is incremented, the values of $\delta,\gamma$ are updated according to the same principle as previously. After the updating of the variables, one returns to step 5 for a new demodulation attempt.

At the end of the scanning, in other words in 593, when the number $M_2$ of iterations is attained, the parameters $\delta_1,\gamma_1$ making the value $\Phi_{min}$ are then used to demodulate the OFDM signal. Finally, the demodulator thus uses the parameters:

$$\Delta f = \frac{\Delta\varphi_0}{2\pi T_e}; \quad \Delta t = \delta_1 \cdot T_e; \quad \hat{D}T_c = \gamma_1 T_e; \quad T_c = \beta_0 T_e; \qquad (25)$$

According to this embodiment, the first loop enables the estimation of the useful time of the symbol and the second loop that of the duration of the prefix. Alternatively, the first loop may enable the estimation of the duration of the prefix, and the second loop that of the time of the useful part.

In all cases, after the demodulation obtained by means of the parameters (25), the equalisation of the demodulated symbols may be carried out, in a manner known to those skilled in the art, in order to estimate the information symbols.

The invention claimed is:

1. A blind estimation method of at least one temporal modulation parameter of an orthogonal frequency division multiplex (OFDM) signal, said temporal modulation parameter being a useful time, a guard interval, or a repetition period of OFDM symbols of said OFDM signal, wherein:

a plurality of demodulation attempts of said OFDM signal are carried out using a plurality of respective values of the temporal parameter, the OFDM signal being demodulated in base band by means of a demodulation frequency, then sampled at a frequency greater than a Nyquist frequency to obtain a sequence of samples;

said samples are corrected by a phase offset ($\Delta\phi$) corresponding to a frequency offset value ($\Delta f$) between a carrier frequency of an OFDM multiplex of the OFDM signal and the demodulation frequency; and, for each demodulation attempt, a cost function representative of the entropy of the demodulated signal is calculated, an estimate of said temporal parameter being obtained as a value of this parameter minimising said cost function.

2. The estimation method according to claim 1, characterised in that, for each demodulation attempt, the sequence formed by the samples thereby corrected is stripped of a given number ($\delta$) of its first samples, corresponding to a temporal offset.

3. The estimation method according to claim 2, characterised in that, for each demodulation attempt, the sequence thus stripped is cut up into blocks of given size ($\gamma+\beta$), that each of the blocks thereby obtained is stripped of a given number ($\gamma$) of its first samples, corresponding to an OFDM symbol prefix time, and that a FFT of each of the blocks thus stripped is performed.

4. The estimation method according to claim 3, characterised in that, for each block k=0, ...,K−1 where K is the total number of blocks of the stripped sequence, the FFT is calculated by:

$$\hat{a}_{k,n} = \sum_{p=0}^{\beta-1} \rho_p^k e^{2i\pi \frac{np}{\beta}}$$

where β is the size of the stripped blocks, corresponding to an OFDM symbol useful time, $T_e$ is the sampling period, $\rho_p^k$ is the $(p+1)^{th}$ frequency corrected sample of the $k^{th}$ block and the $\hat{a}_{k,n}$, k=0,..., K−1, n=0, ..., Ñ−1 where Ñ is said useful time expressed in chip periods, form a sequence of demodulated symbols according to said demodulation attempt.

5. The estimation method according to claim 4, characterised in that the value of said cost function is calculated from said sequence of demodulated symbols.

6. The estimation method according to claim 1, characterised in that said cost function is the kurtosis.

7. The estimation method according to claim 5, characterised in that the value of said cost function is calculated by:

$$\hat{\kappa}(\{\hat{a}_{k,n}\}) = \frac{\sum_{k=0}^{K-1}\sum_{n=0}^{\tilde{N}-1}|\hat{a}_{k,n}|^4}{\left(\sum_{k=0}^{K-1}\sum_{n=0}^{\tilde{N}-1}|\hat{a}_{k,n}|^2\right)^2} - 2 - \frac{\left|\sum_{k=0}^{K-1}\sum_{n=0}^{\tilde{N}-1}(\hat{a}_{k,n})^2\right|^2}{\left(\sum_{k=0}^{K-1}\sum_{n=0}^{\tilde{N}-1}|\hat{a}_{k,n}|^2\right)^2}$$

8. The estimation method according to claim 4, characterised in that it is carried out in an iterative manner, each iteration corresponding to a demodulation attempt by means of said frequency offset value, a temporal offset value, said prefix time and said useful time.

9. The estimation method according to claim 8, characterised in that as the iterations proceed, a discrete series of frequency offset, temporal offset, prefix time and useful time values are run through, according to a scanning algorithm, and that as estimate(s) of the temporal parameter(s), the prefix time and/or the useful time achieving the minimum of the cost function on said series is(are) retained.

10. The estimation method according to claim 9, characterised in that said scanning algorithm is of gradient descent type.

11. The estimation method according to claim 1, characterised in that one carries out a plurality of demodulation attempts, hereinafter referred to as first modulation attempts, to estimate a first time parameter, then a plurality of second demodulation attempts, hereinafter referred to as second modulation attempts, to estimate a second time parameter, said second demodulation attempts using the estimate of the first time parameter to demodulate the OFDM signal.

12. The estimation method according to claim 11, characterised in that, for each first demodulation attempt, the samples are corrected by the phase offset (Δϕ) corresponding to the frequency offset value (Δf) between the carrier frequency of the OFDM multiplex and the demodulation frequency.

13. The estimation method according to claim 12, characterised in that, for each first demodulation attempt, the sequence thus stripped is truncated after a given number of samples, said number corresponding to one given OFDM symbol useful time, then a FFT is performed on the samples of the sequence thereby truncated.

14. The estimation method according to claim 13, characterised in that the FFT is calculated by:

$$\hat{a}_n = \sum_{p=0}^{\beta-1} \rho_p e^{2i\pi \frac{np}{\beta}}$$

where β is the length of the truncated sequence, $T_e$ is the sampling period, $\rho_p$ is the $(p+1)^{th}$ frequency corrected sample of the truncated sequence, the $\hat{a}_n$, n=0, ..., Ñ−1, where Ñ is said useful time expressed in chip periods, forming a sequence of demodulated symbols according to said first demodulation attempt.

15. The estimation method according to claim 14, characterised in that a first value (Φ(Δϕ,δ,β)) of said cost function is calculated from said sequence of demodulated symbols.

16. The estimation method according to claim 11, characterised in that said cost function is the kurtosis.

17. The estimation method according to claim 15, characterised in that the value of said cost function is calculated by:

$$\hat{\kappa}(\{\hat{a}_n\}) = \frac{\sum_{n=0}^{\tilde{N}-1}|\hat{a}_n|^4}{\left(\sum_{n=0}^{\tilde{N}-1}|\hat{a}_n|^2\right)^2} - 2 - \frac{\left|\sum_{n=0}^{\tilde{N}-1}(\hat{a}_n)^2\right|^2}{\left(\sum_{n=0}^{\tilde{N}-1}|\hat{a}_n|^2\right)^2}$$

18. The estimation method according to claim 14, characterised in that it is carried out in an iterative manner, each iteration corresponding to a first demodulation attempt by means of said frequency offset value, a temporal offset value, a prefix time and said useful time.

19. The estimation method according to claim 18, characterised in that, as the iterations proceed, a discrete series of frequency offset, temporal offset, prefix time and useful time values are run through, according to a scanning algorithm, and that the frequency offset, temporal offset and useful time values achieving the minimum of the cost function on said series is memorised, the estimation of the first time parameter being the useful time thereby memorised.

20. The estimation method according to claim 19, characterised in that, each sample of said sequence of samples is corrected by a phase offset (Δϕ₀) corresponding to the frequency offset value (Δf) thereby memorised.

21. The estimation method according to claim 20, characterised in that, for each second demodulation attempt, the sequence formed by the samples thereby corrected is stripped of a given number of its first samples, corresponding to a temporal offset, the stripped sequence is cut up into blocks of given size (γ+β₀) and from each of said blocks a given number of its first samples are removed, corresponding to an OFDM symbol prefix time.

22. The estimation method according to claim 21, characterised in that, for each block k=0, ..., K−1 where K is the total number of blocks obtained, a FFT is calculated by:

$$\hat{a}_{k,n} = \sum_{p=0}^{\beta_0-1} \rho_p^k e^{2i\pi \frac{np}{\beta_0}}$$

where $\beta_0$ is the value of useful time memorised, expressed in number of samples, $T_e$ is the sampling period, $\rho_p^k$ is the (p+1)$^{th}$ frequency corrected sample of the k$^{th}$ block and the $\hat{a}_{k,n}$, k=0, ..., K−1, n=0, ..., Ñ−1, form a sequence of demodulated symbols according to said second demodulation attempt.

23. The estimation method according to claim 22, characterised in that a second value($\Phi(\delta,\gamma)$) of said cost function is calculated from said sequence of demodulated symbols.

24. The estimation method according to claim 23, characterised in that said cost function is the kurtosis.

25. The estimation method according to claim 24, characterised in that the value of said cost function is calculated by:

$$\Phi(\delta, \gamma) = \hat{\kappa}(\{\hat{a}_{k,n}\}) = \frac{\sum_{k=0}^{K-1}\sum_{n=0}^{\tilde{N}-1} |\hat{a}_{k,n}|^4}{\left(\sum_{k=0}^{K-1}\sum_{n=0}^{\tilde{N}-1} |\hat{a}_{k,n}|^2\right)^2} - 2 - \frac{\left|\sum_{k=0}^{K-1}\sum_{n=0}^{\tilde{N}-1} (\hat{a}_{k,n})^2\right|^2}{\left(\sum_{k=0}^{K-1}\sum_{n=0}^{\tilde{N}-1} |\hat{a}_{k,n}|^2\right)^2}.$$

26. The estimation method according to claim 25, characterised in that it is carried out in an iterative manner, each iteration corresponding to a second demodulation attempt by means of the memorised frequency offset and useful time values, said temporal offset value and said prefix time.

27. The estimation method according to claim 26, characterised in that, as the iterations proceed, a series of temporal offset and prefix time values is run through, according to a scanning algorithm, and that the temporal offset and prefix time values achieving the minimum of the cost function on said series is memorised, the estimation of the second time parameter being the prefix time thereby memorised.

28. The estimation method according to claim 19, characterised in that the scanning algorithm is of gradient descent type.

* * * * *